(12) United States Patent
Zhu et al.

(10) Patent No.: US 12,450,713 B2
(45) Date of Patent: Oct. 21, 2025

(54) CLOSED-CIRCUIT TELEVISION (CCTV) ONLINE PIPELINE DETECTION SYSTEM

(71) Applicant: YANCHENG DUCHENG CONSTRUCTION CO., LTD, Yancheng (CN)

(72) Inventors: Yan Zhu, Yancheng (CN); Yuxiang Wei, Yancheng (CN); Caihao Hu, Yancheng (CN)

(73) Assignee: YANCHENG DUCHENG CONSTRUCTION CO., LTD, Yancheng (CN)

( * ) Notice: Subject to any disclaimer, the term of this patent is extended or adjusted under 35 U.S.C. 154(b) by 338 days.

(21) Appl. No.: 18/197,132

(22) Filed: May 15, 2023

(65) Prior Publication Data
US 2023/0281782 A1    Sep. 7, 2023

Related U.S. Application Data

(63) Continuation of application No. PCT/CN2022/140686, filed on Dec. 21, 2022.

(30) Foreign Application Priority Data

Feb. 22, 2022    (CN) .......................... 202210159647.3

(51) Int. Cl.
*G06T 7/00* (2017.01)
*B25J 19/00* (2006.01)
(Continued)

(52) U.S. Cl.
CPC ......... *G06T 7/0004* (2013.01); *B25J 19/0029* (2013.01); *B25J 19/023* (2013.01);
(Continued)

(58) Field of Classification Search
CPC ......... G06T 7/0004; G06T 2207/30164; G06T 2207/30184; G06T 7/0008;
(Continued)

(56) References Cited

FOREIGN PATENT DOCUMENTS

| CN | 106115489 A | * | 11/2016 | ............. | B66C 13/46 |
| CN | 106439385 A | * | 2/2017 | ............. | F16L 55/32 |

(Continued)

OTHER PUBLICATIONS

Google machine translation of CN-113503927-A to Liu, Ying, translated Jun. 12, 2025, 13 pages. (Year: 2025).*

(Continued)

*Primary Examiner* — Hadi Akhavannik
*Assistant Examiner* — Dennis Rosario
(74) *Attorney, Agent, or Firm* — Bayramoglu Law Offices LLC

(57) ABSTRACT

A closed-circuit television (CCTV) online pipeline detection system includes a detection robot and a control terminal of the detection robot, where the detection robot is provided with a CCTV pipeline detection system adapted to the detection robot; the CCTV pipeline detection system includes a GTR8600 monitoring module, a drive device, and a power drive device; the control terminal is separately electrically connected with the GTR8600 monitoring module, the drive device, and the power drive device through a control system; and the control system is provided inside the control terminal.

6 Claims, 2 Drawing Sheets

(51) Int. Cl.
- *B25J 19/02* (2006.01)
- *G01N 21/88* (2006.01)
- *G01N 21/954* (2006.01)
- *G05D 1/00* (2024.01)
- *G06F 16/28* (2019.01)
- *G06F 18/24* (2023.01)
- *G06N 5/04* (2023.01)
- *G06T 7/10* (2017.01)
- *G06V 10/20* (2022.01)
- *G06V 10/26* (2022.01)
- *G06V 10/40* (2022.01)
- *G06V 10/44* (2022.01)
- *G06V 10/764* (2022.01)
- *G06V 20/00* (2022.01)
- *G06V 20/10* (2022.01)
- *G06V 40/16* (2022.01)
- *H04N 7/18* (2006.01)
- *H04N 23/50* (2023.01)

(52) U.S. Cl.
CPC ......... *G01N 21/954* (2013.01); *G05D 1/0214* (2013.01); *G06F 16/285* (2019.01); *G06F 18/24* (2023.01); *G06N 5/04* (2013.01); *G06T 7/0002* (2013.01); *G06T 7/0008* (2013.01); *G06T 7/10* (2017.01); *G06V 10/20* (2022.01); *G06V 10/26* (2022.01); *G06V 10/40* (2022.01); *G06V 10/44* (2022.01); *G06V 10/764* (2022.01); *G06V 20/176* (2022.01); *G06V 20/39* (2022.01); *G06V 40/161* (2022.01); *G06V 40/172* (2022.01); *H04N 7/18* (2013.01); *H04N 7/185* (2013.01); *H04N 23/555* (2023.01); *G01N 2021/8867* (2013.01); *G01N 2021/8887* (2013.01); *G05B 2219/39* (2013.01); *G05B 2219/39219* (2013.01); *G05B 2219/39359* (2013.01); *G05B 2219/40042* (2013.01); *G05B 2219/40364* (2013.01); *G05B 2219/40369* (2013.01); *G05B 2219/40543* (2013.01); *G05B 2219/40563* (2013.01); *G05B 2219/40565* (2013.01); *G05B 2219/50391* (2013.01); *G06T 2207/20024* (2013.01); *G06T 2207/20112* (2013.01); *G06T 2207/30108* (2013.01)

(58) Field of Classification Search
CPC . G06T 2207/30261; G06T 2207/30108; G06T 2207/30116; G06T 2207/30132; G06T 2207/20024; G06T 2207/20112; G06T 2207/20182; G05D 1/0214; G06V 10/764; G06V 20/52; G06V 40/172; G06V 20/176; G06V 20/38; G06V 20/39; G06V 40/161; G06V 40/162; G06V 10/70; G06V 10/26; G06V 10/267; H04N 23/555; G01N 21/954; G01N 21/8851; G01N 2021/8887; G06F 18/24; G06F 16/254; G06F 16/285; G06N 5/04; G06N 20/00; B25J 11/00; B25J 13/00; B25J 13/06; B25J 19/023; B25J 9/0003; B25J 9/065; B25J 9/1674; B25J 9/1676; B25J 19/0029; B25J 19/021; B25J 19/022; B25J 19/025; B25J 19/04; B25J 9/1664; B25J 9/1666

See application file for complete search history.

(56) References Cited

FOREIGN PATENT DOCUMENTS

| | | | | | |
|---|---|---|---|---|---|
| CN | 207316352 | U | | 5/2018 | |
| CN | 207867340 | U | | 9/2018 | |
| CN | 109268621 | A | | 1/2019 | |
| CN | 109373203 | A | * | 2/2019 | ............ G01N 29/04 |
| CN | 109611641 | A | | 4/2019 | |
| CN | 210770995 | U | * | 6/2020 | |
| CN | 111396754 | A | * | 7/2020 | ............... F17D 5/00 |
| CN | 211649493 | U | | 10/2020 | |
| CN | 211738405 | U | | 10/2020 | |
| CN | 112113150 | A | * | 12/2020 | ............ G01N 21/954 |
| CN | 212251706 | U | | 12/2020 | |
| CN | 112763499 | A | | 5/2021 | |
| CN | 112906699 | A | * | 6/2021 | ............ G06F 18/214 |
| CN | 213634512 | U | * | 7/2021 | |
| CN | 113503927 | A | * | 10/2021 | ............. H04N 23/50 |
| CN | 113775033 | A | * | 12/2021 | ............. G01S 15/89 |
| CN | 114120194 | A | * | 3/2022 | ............. F03D 17/00 |
| CN | 112543859 | B | * | 7/2022 | ............. G01S 17/06 |
| KR | 20060128593 | A | | 12/2006 | |

OTHER PUBLICATIONS

Search machine translation of CN-106439385-A to Tao, translated Jun. 12, 2025, 5 pages. (Year: 2025).*
Search machine translation of CN-111396754-A to Wu, translated Jun. 12, 2025, 7 pages. (Year: 2025).*
Search machine translation of CN-113775033-A to Zhang, translated Jun. 12, 2025, 9 pages. (Year: 2025).*
Search machine translation of CN-112906699-A to Liu, Mao-xi, translated Jun. 12, 2025, 11 pages. (Year: 2025).*
Google machine translation of CN-109373203-A to Peng, translated Jun. 12, 2025, 13 pages. (Year: 2025).*
Search machine translation of CN-114120194-A to Tong, translated Jun. 12, 2025, 5 pages. (Year: 2025).*
Search machine translation of CN-112113150-A to Xu, translated Jun. 12, 2025, 10 pages. (Year: 2025).*
Search machine translation of CN-213634512-A to Liu, Yun, translated Jun. 12, 2025, 4 pages. (Year: 2025).*
Search machine translation of IDS (6/2/2O3) cited CN-211649493-A to Min, translated Jun. 13, 2025, 9 pages. (Year: 2025).*
Search machine translation of CN-210770995-U to Feng, translated Jun. 13, 2025, 5 pages. (Year: 2025).*
Search machine translation of CN-106115489-A to Tang, translated Jun. 13, 2025, 6 pages. (Year: 2025).*
Huang et al., Rapid Surface Damage Detection Equipment for Subway Tunnels Based on Machine Vision System, 2021 [STIC retrieved Sep. 4, 2024], Journal of Infrastructure Systems, vol. 27, Issue 1, 12 pages. https://doi.org/10.1061/(ASCE)IS.1943-555X.0000591 (Year: 2021).*
Zhang et al., Principles of Intelligent Rail Transit, Nov. 28, 2022 (eBook) [retrieved Sep. 3, 2025], Springer Singapore, Edition No. 1, 315 pages. DOI: https://doi.org/10.1007/978-981-19-6072-7 (Year: 2022).*
Search machine translation of CN-112543859-B to Zhao, translated Sep. 3, 2025, 28 pages. (Year: 2025).*

* cited by examiner

CLOSED-CIRCUIT TELEVISION (CCTV) ONLINE PIPELINE DETECTION SYSTEM

CROSS-REFERENCES TO THE RELATED APPLICATIONS

This application is a continuation application of PCT/CN2022/140686 filed on Dec. 21, 2022, which is based on and claims priority to Chinese patent application No. 202210159647.3 filed on Feb. 22, 2022, the entire contents of which are incorporated herein by reference.

TECHNICAL FIELD

The present disclosure relates to the technical field of closed-circuit television (CCTV) pipeline detection robots and artificial intelligence (AI), and in particular to a CCTV online pipeline detection system.

BACKGROUND

Urban sewer pipelines bear the responsibility of commercial, industrial, and domestic sewage discharge, but their management is difficult. At present, there is a robot specifically designed for sewer pipeline detection, which regularly acquires images of the sewer pipeline for detection and maintenance. With the expansion of the urban structure, many pipeline problems, such as sludge and damage, need to be dealt with in a timely manner to reduce safety hazards and avoid causing huge losses to the urban economy.

Chinese Patent Application CN211738405U provides a detection system for an urban underground pipeline network. The detection system includes a camera body, a data transmission line, an adjustment wheel, and a control box. The adjustment wheel is provided with an adjustable-diameter tire, which meets the needs of detecting sewer pipelines with different diameters, improving the versatility of the adjustment wheel and reducing the overall manufacture and detection costs. However, the detection system is improved only in terms of the structure of a detection robot.

SUMMARY

In order to solve the above-mentioned problems existing in the prior art, the present disclosure provides a closed-circuit television (CCTV) online pipeline detection system.

The present disclosure provides a CCTV online pipeline detection system. The CCTV online pipeline detection system includes a control terminal, a detection robot, and a CCTV pipeline detection system adapted to the detection robot, where the CCTV pipeline detection system is provided inside the detection robot; and the control terminal is electrically connected with the detection robot and the CCTV pipeline detection system through a control system; and the control system is provided in the control terminal.

In an embodiment of the technical solution, the CCTV pipeline detection system includes a GTR8600 monitoring module, a drive module, and a power drive module;

the GTR8600 monitoring module is provided on the detection robot;

through the control terminal, the drive module drives a drive control device to move; and a power drive device is provided with a power drive system; and the power drive system is controlled by the control system to control the drive device of the power drive system for conventional movements.

In an embodiment of the technical solution, the GTR8600 monitoring module includes an industrial high-resolution color camera unit, a motion posture monitoring unit, an image recording and processing terminal, and a transmission unit;

the industrial high-resolution color camera unit is configured to acquire an external image, and generate a resolution image based on the external image;

the motion posture monitoring unit is configured to monitor and identify an internal state of a pipeline in real time based on the resolution image, and infer a motion posture of the detection robot based on the internal state of the pipeline to generate an inference result;

the image recording and processing terminal is configured to record and process the acquired external image and the corresponding internal state of the pipeline, and generate a recording result; and the transmission unit is configured to transmit the inference result and the recording result to the control terminal.

In an embodiment of the technical solution, the industrial high-resolution color camera unit includes:

an image acquisition subunit, configured to acquire, by a preset camera device, the external image of the pipeline in real time;

an image identification subunit, configured to extract and identify a feature of the external image based on a preset color image space conversion mechanism to generate an identified image; and a resolution image subunit, configured to perform high-resolution reconstruction on the identified image based on a preset high-resolution reconstruction mechanism to generate the resolution image.

In an embodiment of the technical solution, the motion posture monitoring unit includes:

an offset angle subunit, configured to receive the resolution image, transmit the resolution image to a preset balance detection mechanism, and calculate an offset angle of the resolution image;

a robot state subunit, configured to monitor and identify a state of the detection robot in real time based on the offset angle;

a state information subunit, configured to receive the resolution image according to a preset period, record the internal state of the pipeline, and generate corresponding state information based on the state of the detection robot and the internal state of the pipeline; and an inference subunit, configured to extract a resolution feature point of the resolution image based on the state information, transmit the resolution feature point to a preset big data center for analysis, and infer the motion posture of the detection robot to generate the inference result.

In an embodiment of the technical solution, the image recording and processing terminal includes:

an acquisition result unit, configured to confirm an acquisition result based on the external image acquired in real time and the corresponding internal state of the pipeline;

a determination unit, configured to determine, in real time, whether the internal state of the pipeline is abnormal based on the acquisition result, and generate a determination result;

a normal processing unit, configured to: if the determination result is normal, record the corresponding external image, compress the recorded external image, upload the compressed external image to a preset cloud storage library for storage, and generate a normal recording result;

an abnormal processing unit, configured to: if the determination result is abnormal, acquire the internal state of the abnormal pipeline, retrieve a historical normal recording result from the preset cloud storage library within a preset time, transmit the internal state of the abnormal pipeline to the big data center for analysis and recording, and generate an abnormal recording result;

a warning unit, configured to transmit the abnormal recording result to the control terminal in real time for warning; and a recording result unit, configured to generate the recording result based on the normal recording result and the abnormal recording result.

In an embodiment of the technical solution, the state information subunit includes:

an image processing subunit, configured to receive the resolution image according to the preset period, and perform grayscaling and normalization on the image pixels of the resolution image to generate a processed image;

a local image subunit, configured to stretch and segment the processed image to generate a local image;

an identification result subunit, configured to identify a pipeline damage type based on the local image, and generate an identification result;

a statistical subunit, configured to perform a statistical analysis on a pipeline damage location and the corresponding pipeline damage type within a preset detection region based on the identification result;

a pipeline internal state subunit, configured to determine the internal state of the pipeline based on the pipeline damage location and the corresponding pipeline damage type; and a state information subunit, configured to acquire a receiving time corresponding to the internal state of the pipeline, trace the corresponding state of the detection robot based on the receiving time, and generate corresponding state information.

In an embodiment of the technical solution, the inference subunit includes:

a state information type subunit, configured to transmit the state information to a preset type filter for classification, and determine a state information type;

$$S_i = \frac{1}{w_{i,j} \cdot L} \sum_{i=1}^{m} \sum_{j=1}^{n} \frac{p(f_i, a_j) \cdot \varphi(\Delta t, p(f_i, a_j))}{\max \varphi(\Delta t, p(f_i, a_j)) - \min \varphi(\Delta t, p(f_i, a_j))}$$

where, $S_i$ denotes an i-th state information type, $i=1,2,\ldots,m$; m denotes a total number of batches of state information received; $f_i$ denotes an i-th batch of state information, $j=1,2,\ldots,n$; n denotes a total number of type filters; $a_j$ denotes a j-th type filter; $p(f_i, a_j)$ denotes a filtering probability of the i-th batch of state information in the j-th type filter; $w_{i,j}$ denotes a weight generated by the i-th batch of state information entering the j-th type filter; L denotes an influence coefficient of the type filter; $\Delta t$ denotes the receiving time of the state information; $\varphi(\Delta t, p(f_i, a_j))$ denotes a separation function of the filtering probability of the i-th batch of state information in the j-th type filter at the receiving time $\Delta t$; $\max \varphi(\Delta t, p(f_i, a_j))$ denotes a maximum separation function of the filtering probability of the i-th batch of state information in the j-th type filter at the receiving time $\Delta t$; and $\min \varphi(\Delta t, p(f_i, a_j))$ denotes a minimum separation function of the filtering probability of the i-th batch of state information in the j-th type filter at the receiving time $\Delta t$;

a classification subunit, configured to extract the resolution feature point of the resolution image based on the state information type, and classify the resolution feature point to generate a classification result;

$$D(S) = \begin{cases} E(S_i) \cdot R(g_i) \\ \sqrt{E(S_i) \cdot E(S_{i^*})} \cdot R(Te(g_i \to g_{i^*}) = 1|(g_i, g_{i^*})) \\ E(S_{i^*}) \cdot R(g_{i^*}) \end{cases}$$

where, $D(S)$ denotes the classification result of the state information type; $g_i$ denotes the resolution feature point of the i-th state information type; $R(g_i)$ denotes a main feature classification function of the resolution feature point of the i-th state information type; $E(S_i)$ denotes a weight for classifying the resolution feature point of the i-th state information type; $E(S_{i^*})$ denotes a weight for classifying the resolution feature point of an i*-th state information type, $i^*=1,2,\ldots,m$, $i \neq i^*$; $R(g_{i^*})$ denotes a main feature classification function of the resolution feature point of the i*-th state information type; $Te(g_i \to g_{i^*})$ denotes a function for determining whether the resolution feature point of the i-th state information type coincides with the resolution feature point of the j-th state information type; $Te(g_i \to g_{i^*}) = 1$ means that the resolution feature point of the i-th state information type coincides with the resolution feature point of the j-th state information type; $R(Te(g_i \to g_{i^*}) = 1|(g_i, g_{i^*}))$ denotes a main feature classification function when the resolution feature point of the i-th state information type coincides with the resolution feature point of the j-th state information type; and if the resolution feature point of the i-th state information type does not coincide with the resolution feature point of the j-th state information type, the resolution feature point of the i-th state information type is returned to $$\frac{E(S_i)}{R(g_i)}$$

for classification calculation, and the resolution feature point of the j-th state information type is returned to $$\frac{E(S_j)}{R(g_{i^*})}$$

for classification calculation;

an action model subunit, configured to transmit the classification result and the resolution feature point to the preset big data center for analysis, and construct a corresponding action model; and an inference result subunit, configured to infer the motion posture of the detection robot based on the action model to generate the inference result.

In an embodiment of the technical solution, the drive control device is provided with a drive system and an obstacle avoidance system; and the drive system is configured to control the drive control device through the control system, such that the drive control device starts and generates power to drive the drive control device to move; and the obstacle avoidance system is configured to receive a control signal from the control system and perform obstacle avoidance for the drive control device.

In an embodiment of the technical solution, a power drive device is provided with a power drive system; and the power drive system is controlled by the control system to control the drive device of the power drive system for conventional movements.

The technical solution of the present disclosure has the following beneficial effects:

The embodiment of the present disclosure provides a CCTV online pipeline detection system, including an external control terminal, a detection robot, and a CCTV pipeline detection system adapted to the detection robot. The CCTV pipeline detection system is provided inside the detection robot. The detection robot is configured to detect a pipeline during operation. The external control terminal is configured to control the detection robot to conduct key or non-key detections of different regions of the pipeline, reducing detection costs. Meanwhile, the detection robot can be protected from getting stuck in mud and other hazards as much as possible. The control terminal is electrically connected with the detection robot and the CCTV pipeline detection system through the control system. The control system is provided in the control terminal for controlling the detection robot. The technical solution provides a detection method for the CCTV online pipeline detection robot. The detection robot is controlled to detect an urban pipeline. Considering the high cost of the detection robot, real-time measurement of the pipeline can be carried out to reduce damage to the detection robot. For the large, complex, and structurally diverse urban pipelines, manual detections are time-consuming, labor-intensive, and costly. In contrast, the detection of the detection robot reduces the time cost of workers and improves work efficiency.

Other features and advantages of the present disclosure will be illustrated in the following description, and some of these will become apparent from the description or be understood by implementing the present disclosure. The objectives and other advantages of the present disclosure may be implemented by the structure specifically indicated in the specification and drawings.

The technical solutions of the present disclosure will be further described in detail below with reference to drawings and embodiments.

BRIEF DESCRIPTION OF THE DRAWINGS

The drawings are provided for further understanding of the present disclosure and constitute a part of the specification. The drawings, together with the embodiments of the present disclosure, are intended to explain the present disclosure, rather than to limit the present disclosure. In the drawings.

DETAILED DESCRIPTION OF THE EMBODIMENTS

The preferred embodiments of the present disclosure are described below with reference to the drawings. It should be understood that the preferred embodiments described herein are only used to illustrate the present disclosure, rather than to limit the present disclosure.

Embodiment 1

Figure 1:
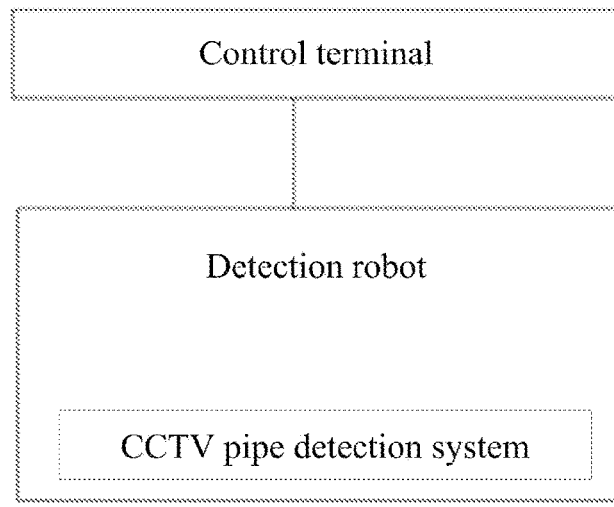
FIG. 1 is a block diagram of a closed-circuit television (CCTV) online pipeline detection system according to an embodiment of the present disclosure.
Figure 2:
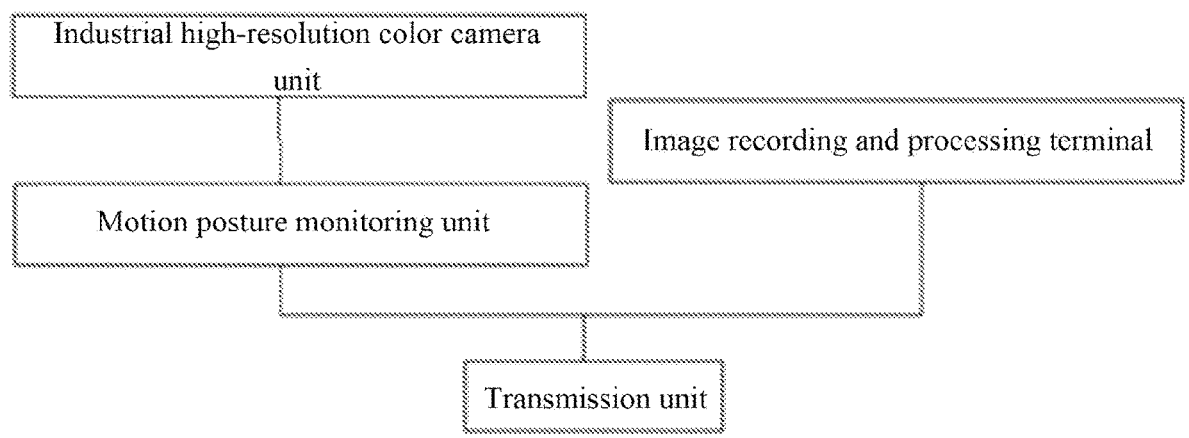
FIG. 2 is a block diagram of the CCTV online pipeline detection system according to an embodiment of the present disclosure.
Figure 3:
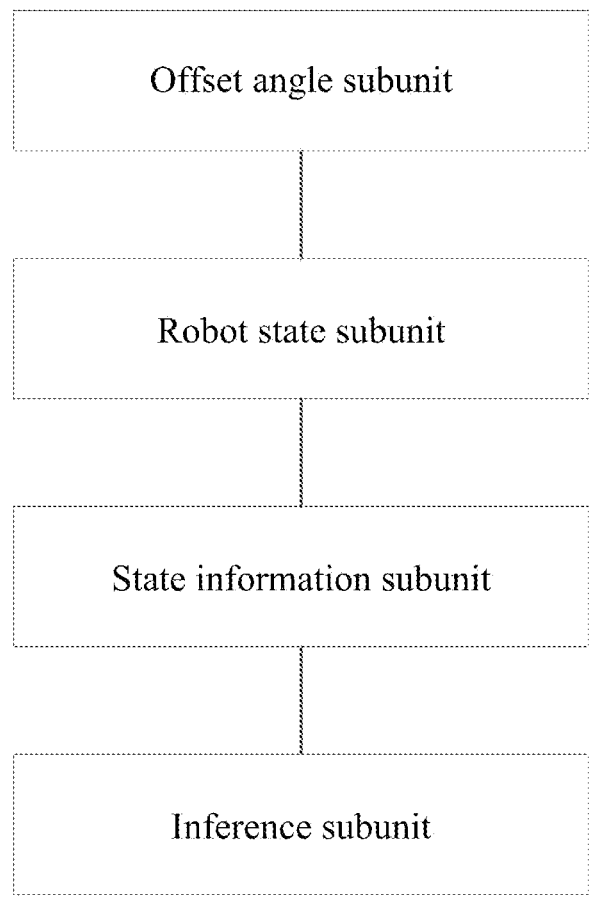
FIG. 3 is a block diagram of the CCTV online pipeline detection system according to an embodiment of the present disclosure.

As shown in FIG. 1, the embodiment of the present disclosure provides a CCTV online pipeline detection system. The CCTV online pipeline detection system includes a control terminal, a detection robot, and a CCTV pipeline detection system adapted to the detection robot, where the CCTV pipeline detection system is provided inside the detection robot.

The control terminal is electrically connected with the detection robot and the CCTV pipeline detection system through a control system; and the control system is provided in the control terminal.

The working principle of the above technical solution is as follows:

The embodiment of the present disclosure provides a CCTV online pipeline detection system, including the external control terminal, the detection robot, and the CCTV pipeline detection system adapted to the detection robot. The CCTV pipeline detection system is provided inside the detection robot. The detection robot is configured to detect a pipeline during operation. The external control terminal is configured to control the detection robot to conduct key or non-key detections of different regions of the pipeline, reducing detection costs. Meanwhile, the detection robot can be protected from getting stuck in mud and other hazards as much as possible. The control terminal is electrically connected with the detection robot and the CCTV pipeline detection system through the control system. The control system is provided in the control terminal for controlling the detection robot.

The beneficial effects of the above technical solution are as follows:

The technical solution provides a detection method for the CCTV online pipeline detection robot. The detection robot is controlled to detect an urban pipeline. Considering the high cost of the detection robot, real-time measurement of the pipeline can be carried out to reduce damage to the detection robot. For the large, complex, and structurally diverse urban pipelines, manual detections are time-consuming, labor-intensive, and costly. In contrast, the detection of the detection robot reduces the time cost of workers and improves work efficiency.

Embodiment 2

In the embodiment, the CCTV pipeline detection system includes a GTR8600 monitoring module, a drive module, and a power drive module.

The GTR8600 monitoring module is provided on the detection robot.

Through the control terminal, the drive module drives a drive control device to move.

A power drive device is provided with a power drive system; and the power drive system is controlled by the control system to control the drive device of the power drive system for conventional movements.

The working principle of the above technical solution is as follows:

In the technical solution, the CCTV pipeline detection system includes the GTR8600 monitoring module, the drive module, and the power drive module. The GTR8600 monitoring module is provided on the detection robot, and the GTR8600 monitoring module provides an industrial high-resolution color camera function to monitor urban and enterprise-owned pipelines and conduct timely detections on potential pipeline hazards. The drive module drives the drive control device to move through the control terminal. The power drive device is provided with the power drive system. The control system is configured to control the power drive system to control the drive device of the power drive system for conventional movements.

The beneficial effects of the above technical solution are as follows:

The technical solution improves the obstacle avoidance ability of the detection robot and reduces damage to the detection robot by implementing control through the control terminal rather than conventional route settings. Meanwhile, the detection robot can perform simple cleaning on the pipeline, for example, a drive wheel of the detection robot can crush and break a horizontal rod-like object in the pipeline, thereby facilitating the dredging of the pipeline.

Embodiment 3

In the embodiment, the GTR8600 monitoring module includes an industrial high-resolution color camera unit, a motion posture monitoring unit, an image recording and processing terminal, and a transmission unit.

The industrial high-resolution color camera unit is configured to acquire an external image, and generate a resolution image based on the external image.

The motion posture monitoring unit is configured to monitor and identify an internal state of a pipeline in real time based on the resolution image, and infer a motion posture of the detection robot based on the internal state of the pipeline to generate an inference result.

The image recording and processing terminal is configured to record and process the acquired external image and the corresponding internal state of the pipeline, and generate a recording result.

The transmission unit is configured to transmit the inference result and the recording result to the control terminal.

The operating principle and beneficial effects of the above technical solution are as follows:

In the technical solution, the GTR8600 monitoring module includes the industrial high-resolution color camera unit, the motion posture monitoring unit, the image recording and processing terminal, and the transmission unit. The industrial high-resolution color camera unit is configured to acquire an external image, and generate a resolution image based on the external image. The motion posture monitoring unit is configured to monitor and identify an internal state of a pipeline in real time based on the resolution image, and infer a motion posture of the detection robot based on the internal state of the pipeline to generate an inference result. The image recording and processing terminal is configured to record and process the acquired external image and the corresponding internal state of the pipeline. The transmission unit is configured to transmit the inference result to the control terminal. By comprehensively analyzing the state of the detection robot and the external environment, the internal state of the pipeline is acquired, providing accurate state information to determine whether maintenance is necessary.

Embodiment 4

In the embodiment, the industrial high-resolution color camera unit includes: an image acquisition subunit, an image identification subunit, and a resolution image subunit.

The image acquisition subunit is configured to acquire, by a preset camera device, the external image of the pipeline in real time.

The image identification subunit is configured to extract and identify a feature of the external image based on a preset color image space conversion mechanism to generate an identified image.

The resolution image subunit is configured to perform high-resolution reconstruction on the identified image based on a preset high-resolution reconstruction mechanism to generate the resolution image.

The operating principle and beneficial effects of the above technical solution are as follows:

In the technical solution, in the industrial high-resolution color camera unit, the image acquisition subunit is configured to acquire, by a preset camera device, the external image of the pipeline in real time. The image identification subunit is configured to extract and identify a feature of the external image based on a preset color image space conversion mechanism to generate an identified image. Through image identification, raw data are acquired for classifying different types of problems of the pipeline. The resolution image subunit is configured to perform high-resolution reconstruction on the identified image based on a preset high-resolution reconstruction mechanism to generate the resolution image. The resolution image facilitates precise identification of the size and location of a pipeline hazard.

Embodiment 5

In the embodiment, the motion posture monitoring unit includes: an offset angle subunit, a robot state subunit, a state information subunit, and an inference subunit.

The offset angle subunit is configured to receive the resolution image, transmit the resolution image to a preset balance detection mechanism, and calculate an offset angle of the resolution image.

The robot state subunit is configured to monitor and identify a state of the detection robot in real time based on the offset angle.

The state information subunit is configured to receive the resolution image according to a preset period, record the internal state of the pipeline, and generate corresponding state information based on the state of the detection robot and the internal state of the pipeline.

The inference subunit is configured to extract a resolution feature point of the resolution image based on the state information, transmit the resolution feature point to a preset big data center for analysis, and infer the motion posture of the detection robot to generate the inference result.

The operating principle and beneficial effects of the above technical solution are as follows:

In the embodiment, in the motion posture monitoring unit, the offset angle subunit is configured to receive the resolution image, transmit the resolution image to a preset balance detection mechanism, and calculate an offset angle of the resolution image. The pipeline internal state subunit is configured to monitor and identify the internal state of the pipeline in real time through the offset angle. The state information subunit is configured to record the internal state of the pipeline according to a preset period, and generate corresponding state information. The inference subunit is configured to extract a resolution feature point of the resolution image based on the state information, transmit the resolution feature point to a preset big data center for analysis, and infer the motion posture of the detection robot to generate the inference result. The technical solution acquires image information and robot information based on analyzing images, and comprehensively determines pipeline damage type, thereby avoiding hidden dangers caused by pipeline defects.

Embodiment 6

In the embodiment, the image recording and processing terminal includes: an acquisition result unit, a determination unit, a normal processing unit, an abnormal processing unit, a warning unit, and a recording result unit.

The acquisition result unit is configured to confirm an acquisition result based on the external image acquired in real time and the corresponding internal state of the pipeline.

The determination unit is configured to determine, in real time, whether the internal state of the pipeline is abnormal based on the acquisition result, and generate a determination result.

The normal processing unit is configured to: if the determination result is normal, record the corresponding external image, compress the recorded external image, upload the compressed external image to a preset cloud storage library for storage, and generate a normal recording result.

The abnormal processing unit is configured to: if the determination result is abnormal, acquire the internal state of the abnormal pipeline, retrieve a historical normal recording result from the preset cloud storage library within a preset time, transmit the internal state of the abnormal pipeline to the big data center for analysis and recording, and generate an abnormal recording result.

The warning unit is configured to transmit the abnormal recording result to the control terminal in real time for warning.

The recording result unit is configured to generate the recording result based on the normal recording result and the abnormal recording result.

The operating principle and beneficial effects of the above technical solution are as follows:

In the technical solution, in the image recording and processing terminal, the acquisition result unit is configured to confirm an acquisition result based on the external image acquired in real time and the corresponding internal state of the pipeline. The determination unit is configured to determine, in real time, whether the internal state of the pipeline is abnormal based on the acquisition result, and generate a determination result. The normal processing unit is configured to: if the determination result is normal, record the corresponding external image, compress the recorded external image, upload the compressed external image to a preset cloud storage library for storage, and generate a normal recording result. The abnormal processing unit is configured to: if the determination result is abnormal, acquire the internal state of the abnormal pipeline, retrieve a historical normal recording result from the preset cloud storage library within a preset time, transmit the internal state of the abnormal pipeline to the big data center for analysis and recording, and generate an abnormal recording result. The warning unit is configured to transmit the abnormal recording result to the control terminal in real time for warning. The recording result unit is configured to generate the recording result based on the normal recording result and the abnormal recording result. Initial pipeline detection is conducted to roughly identify the condition in the pipeline. Normal results are saved, providing reference for exploring causes of pipeline damage detected in the length direction of the pipeline. The design reduces the workload of workers and reduces the manpower and time costs of detection.

Embodiment 7

In the embodiment, the state information subunit includes: an image processing subunit, a local image subunit, an identification result subunit, a statistical subunit, a pipeline internal state subunit, and a state information subunit.

The image processing subunit is configured to receive the resolution image according to the preset period, and perform grayscaling and normalization on the image pixels of the resolution image to generate a processed image.

The local image subunit is configured to stretch and segment the processed image to generate a local image.

The identification result subunit is configured to identify a pipeline damage type based on the local image, and generate an identification result.

The statistical subunit is configured to perform a statistical analysis on a pipeline damage location and the corresponding pipeline damage type within a preset detection region based on the identification result.

The pipeline internal state subunit is configured to determine the internal state of the pipeline based on the pipeline damage location and the corresponding pipeline damage type.

The state information subunit is configured to acquire a receiving time corresponding to the internal state of the pipeline, trace the corresponding state of the detection robot based on the receiving time, and generate corresponding state information.

The operating principle and beneficial effects of the above technical solution are as follows:

In the technical solution, in the state information subunit, the image processing subunit is configured to receive the resolution image according to a preset period, and perform grayscaling and normalization on the image pixels of the resolution image to generate a processed image. Due to the darkness and high noise inside the pipeline, it is necessary to perform noise processing on the acquired image so as to avoid an unclear image. The local image subunit is configured to stretch and segment the processed image to generate a local image. For image identification, the background region of the image is easy to identify, but more attention should be paid to the identification of key regions. The identification result subunit is configured to identify a pipeline damage type based on the local image, and generate an identification result. The pipeline faces different damage risks such as sludge blockage, leakage, and pipeline deformation, and different damage risks will cause different results. The statistical subunit is configured to perform a statistical analysis on a pipeline damage location and the corresponding pipeline damage type within a preset detection region based on the identification result. The location of pipeline damage is determined by a preset positioning system of the control terminal. The pipeline internal state subunit is configured to determine the internal state of the pipeline based on the pipeline damage location and the corresponding pipeline damage type. The state information subunit is configured to acquire a receiving time corresponding to the internal state of the pipeline, trace the corresponding state of the detection robot based on the receiving time, and generate corresponding state information.

Embodiment 8

In the embodiment, the inference subunit includes: a state information type subunit, a classification subunit, an action model subunit, and an inference result subunit.

The state information type subunit is configured to transmit the state information to a preset type filter for classification and determine a state information type $$S_i = \frac{1}{w_{i,j} \cdot L} \sum_{i=1}^{m} \sum_{j=1}^{n} \frac{p(f_i, a_j) \cdot \varphi(\Delta t, p(f_i, a_j))}{\max \varphi(\Delta t, p(f_i, a_j)) - \min \varphi(\Delta t, p(f_i, a_j))}$$

where, $S_i$ denotes an i-th state information type, $i=1,2,\ldots,m$; m denotes a total number of batches of state information received; $f_i$ denotes an i-th batch of state information, $j=1,2,\ldots,n$; n denotes a total number of type filters; $a_j$ denotes a j-th type filter; $p(f_i, a_j)$ denotes a filtering probability of the i-th batch of state information in the j-th type filter; $w_{i,j}$ denotes a weight generated by the i-th batch of state information entering the j-th type filter; L denotes an influence coefficient of the type filter; $\Delta t$ denotes the receiving time of the state information; $\varphi(\Delta t, p(f_i, a_j))$ denotes a separation function of the filtering probability of the i-th batch of state information in the j-th type filter at the receiving time $\Delta t$; max $\varphi(\Delta t, p(f_i, a_j))$ denotes a maximum separation function of the filtering probability of the i-th batch of state information in the j-th type filter at the receiving time $\Delta t$; and min $\varphi(\Delta t, p(f_i, a_j))$ separation function of the filtering probability of the i-th batch of state information in the j-th type filter at the receiving time $\Delta t$.

The classification subunit is configured to extract the resolution feature point of the resolution image based on the state information type, and classify the resolution feature point to generate a classification result.

$$D(S) = \begin{cases} E(S_i) \cdot R(g_i) \\ \sqrt{E(S_i) \cdot E(S_{i^*})} \cdot R(Te(g_i \to g_{i^*}) = 1|(g_i, g_{i^*})) \\ E(S_{i^*}) \cdot R(g_{i^*}) \end{cases}$$

where, D(S) denotes the classification result of the state information type; $g_i$ denotes the resolution feature point of the i-th state information type; $R(g_i)$ denotes a main feature classification function of the resolution feature point of the i-th state information type; $E(S_i)$ denotes a weight for classifying the resolution feature point of the i-th state information type; $E(S_{i^*})$ denotes a weight for classifying the resolution feature point of an i*-th state information type, $i^*=1,2,\ldots,m$, $i \neq i^*$; $R(g_{i^*})$ denotes a main feature classification function of the resolution feature point of the i*-th state information type; $Te(g_i \to g_{i^*})$ denotes a function for determining whether the resolution feature point of the i-th state information type coincides with the resolution feature point of the j-th state information type; $Te(g_i \to g_{i^*})=1$ means that the resolution feature point of the i-th state information type coincides with the resolution feature point of the j-th state information type; $R(Te(g_i \to g_{i^*})=1|(g_i, g_{i^*}))$ denotes a main feature classification function when the resolution feature point of the i-th state information type coincides with the resolution feature point of the j-th state information type; and if the resolution feature point of the i-th state information type does not coincide with the resolution feature point of the j-th state information type, the resolution feature point of the i-th state information type is returned to $$\frac{E(S_i)}{R(g_i)}$$

for classification calculation, and the resolution feature point of the j-th state information type is returned to $$\frac{E(S_j)}{R(g_{i^*})}$$

for classification calculation.

The action model subunit is configured to transmit the classification result and the resolution feature point to the preset big data center for analysis, and construct a corresponding action model.

The inference result subunit is configured to infer the motion posture of the detection robot based on the action model to generate the inference result.

The operating principle and beneficial effects of the above technical solution are as follows:

In the technical solution, in the inference subunit, the state information type subunit is configured to transmit the state information to a preset type filter for classification, and determine a state information type $S_i$. The classification subunit is configured to extract the resolution feature point of the resolution image based on the state information type, and classify the resolution feature point to generate a classification result. The action model subunit is configured to transmit the classification result and the resolution feature point to the preset big data center for analysis, and construct a corresponding action model. The inference result subunit is configured to infer the motion posture of the detection robot based on the action model to generate the inference result.

Embodiment 9

In the embodiment, the drive control device is provided with a drive system and an obstacle avoidance system; and the drive system is configured to control the drive control device through the control system, such that the drive control device starts and generates power to drive the drive control device to move.

The obstacle avoidance system is configured to receive a control signal from the control system and perform obstacle avoidance for the drive control device.

Embodiment 10

In the embodiment, a power drive device is provided with a power drive system; and the power drive system is controlled by the control system to control the drive device of the power drive system for conventional movements.

The working principle and beneficial effects of the above technical solution are as follows:

In the technical solution, a power drive device is provided with a power drive system; and the power drive system is controlled by the control system control the drive device of the power drive system for conventional movements. The power drive device is configured to generate power to drive the drive control device to move. Through the power drive, the direction and speed can be controlled to control the detection robot.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A closed-circuit television (CCTV) online pipeline detection system, comprising a control terminal, a detection robot, and a CCTV pipeline detection system adapted to the detection robot, wherein the CCTV pipeline detection system is provided inside the detection robot; and the control terminal is electrically connected with the detection robot and the CCTV pipeline detection system through a control system; and the control system is provided in the control terminal;

wherein the CCTV pipeline detection system comprises a GTR8600 monitoring module, a drive module, and a power drive module;

the GTR8600 monitoring module is provided on the detection robot;

through the control terminal, the drive module drives a drive control device to move; and a power drive device is provided with a power drive system; and the power drive system is controlled by the control system to control the drive device of the power drive system for conventional movements;

wherein the GTR8600 monitoring module comprises an industrial high-resolution color camera unit, a motion posture monitoring unit, an image recording and processing terminal, and a transmission unit;

the industrial high-resolution color camera unit is configured to acquire an external image and generate a resolution image based on the external image;

the motion posture monitoring unit is configured to monitor and identify an internal state of a pipeline in real time based on the resolution image, and infer a motion posture of the detection robot based on the internal state of the pipeline to generate an inference result;

the image recording and processing terminal is configured to record and process the acquired external image and the corresponding internal state of the pipeline, and generate a recording result; and the transmission unit is configured to transmit the inference result and the recording result to the control terminal;

wherein the motion posture monitoring unit comprises:

an offset angle subunit, configured to receive the resolution image, transmit the resolution image to a preset balance detection mechanism, and calculate an offset angle of the resolution image;

a robot state subunit, configured to monitor and identify a state of the detection robot in real time based on the offset angle;

a state information subunit, configured to receive the resolution image according to a preset period, record the internal state of the pipeline, and generate state information based on the state of the detection robot and the internal state of the pipeline; and an inference subunit, configured to extract a resolution feature point of the resolution image based on the state information, transmit the resolution feature point to a preset big data center for analysis, and infer the motion posture of the detection robot to generate the inference result;

wherein the inference subunit comprises:

a state information type subunit, configured to transmit the state information to a preset type filter for classification, and determine a state information type;

a classification subunit, configured to extract the resolution feature point of the resolution image based on the state information type, and classify the resolution feature point to generate a classification result;

an action model subunit, configured to transmit the classification result and the resolution feature point to the preset big data center for analysis, and construct a corresponding action model; and an inference result subunit, configured to infer the motion posture of the detection robot based on the action model to generate the inference result.

2. The CCTV online pipeline detection system according to claim 1, wherein the industrial high-resolution color camera unit comprises:

an image acquisition subunit, configured to acquire, by a preset camera device, the external image of the pipeline in real time;

an image identification subunit, configured to extract and identify a feature of the external image based on a preset color image space conversion mechanism to generate an identified image; and a resolution image subunit, configured to perform high-resolution reconstruction on the identified image based on a preset high-resolution reconstruction mechanism to generate the resolution image.

3. The CCTV online pipeline detection system according to claim 1, wherein the image recording and processing terminal comprises:

an acquisition result unit, configured to confirm an acquisition result based on the external image acquired in real time and the corresponding internal state of the pipeline;

a determination unit, configured to determine, in real time, whether the internal state of the pipeline is abnormal based on the acquisition result, and generate a determination result;

a normal processing unit, configured to: if the determination result is normal, record the corresponding external image, compress the recorded external image, upload the compressed external image to a preset cloud storage library for storage, and generate a normal recording result;

an abnormal processing unit, configured to: if the determination result is abnormal, acquire the internal state of the abnormal pipeline, retrieve a historical normal recording result from the preset cloud storage library within a preset time, transmit the internal state of the abnormal pipeline to the big data center for analysis and recording, and generate an abnormal recording result;

a warning unit, configured to transmit the abnormal recording result to the control terminal in real time for warning; and a recording result unit, configured to generate the recording result based on the normal recording result and the abnormal recording result.

4. The CCTV online pipeline detection system according to claim 1, wherein the drive control device is provided with a drive system and an obstacle avoidance system;

the drive system is configured to control the drive control device through the control system, such that the drive control device starts and generates power to drive the drive control device to move; and the obstacle avoidance system is configured to receive a control signal from the control system and perform obstacle avoidance for the drive control device.

5. The CCTV online pipeline detection system according to claim 1, wherein the power drive device is provided with the power drive system; and the power drive system is controlled by the control system to control the drive device of the power drive system for conventional movements.

6. A closed-circuit television (CCTV) online pipeline detection system, comprising a control terminal, a detection robot, and a CCTV pipeline detection system adapted to the detection robot, wherein the CCTV pipeline detection system is provided inside the detection robot; and
- the control terminal is electrically connected with the detection robot and the CCTV pipeline detection system through a control system; and the control system is provided in the control terminal;
- wherein the CCTV pipeline detection system comprises a GTR8600 monitoring module, a drive module, and a power drive module;
- the GTR8600 monitoring module is provided on the detection robot;
- through the control terminal, the drive module drives a drive control device to move; and
- a power drive device is provided with a power drive system; and the power drive system is controlled by the control system to control the drive device of the power drive system for conventional movements;
- wherein the GTR8600 monitoring module comprises an industrial high-resolution color camera unit, a motion posture monitoring unit, an image recording and processing terminal, and a transmission unit;
- the industrial high-resolution color camera unit is configured to acquire an external image and generate a resolution image based on the external image;
- the motion posture monitoring unit is configured to monitor and identify an internal state of a pipeline in real time based on the resolution image, and infer a motion posture of the detection robot based on the internal state of the pipeline to generate an inference result;
- the image recording and processing terminal is configured to record and process the acquired external image and the corresponding internal state of the pipeline, and generate a recording result; and
- the transmission unit is configured to transmit the inference result and the recording result to the control terminal;
- wherein the motion posture monitoring unit comprises:
- an offset angle subunit, configured to receive the resolution image, transmit the resolution image to a preset balance detection mechanism, and calculate an offset angle of the resolution image;
- a robot state subunit, configured to monitor and identify a state of the detection robot in real time based on the offset angle;
- a state information subunit, configured to receive the resolution image according to a preset period, record the internal state of the pipeline, and generate corresponding state information based on the state of the detection robot and the internal state of the pipeline; and
- an inference subunit, configured to extract a resolution feature point of the resolution image based on the state information, transmit the resolution feature point to a preset big data center for analysis, and infer the motion posture of the detection robot to generate the inference result;
- wherein the state information subunit comprises:
- an image processing subunit, configured to receive the resolution image according to the preset period, and perform grayscaling and normalization on the image pixels of the resolution image to generate a processed image;
- a local image subunit, configured to stretch and segment the processed image to generate a local image;
- an identification result subunit, configured to identify a pipeline damage type based on the local image, and generate an identification result;
- a statistical subunit, configured to perform a statistical analysis on a pipeline damage location and the corresponding pipeline damage type within a preset detection region based on the identification result;
- a pipeline internal state subunit, configured to determine the internal state of the pipeline based on the pipeline damage location and the corresponding pipeline damage type; and
- a state information subunit, configured to acquire a receiving time corresponding to the internal state of the pipeline, trace the corresponding state of the detection robot based on the receiving time, and generate corresponding state information.

* * * * *